United States Patent Office 2,892,345
Patented June 30, 1959

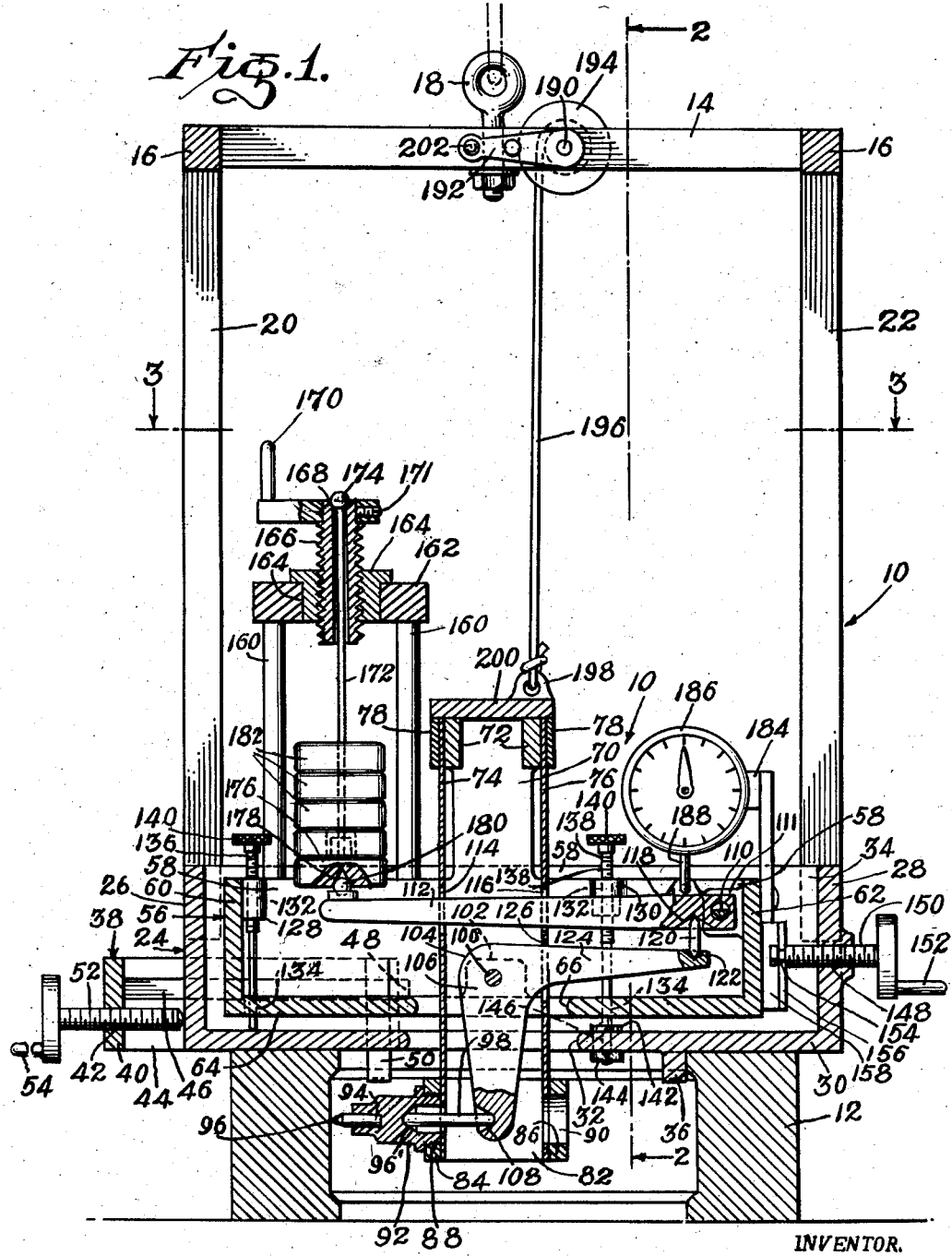

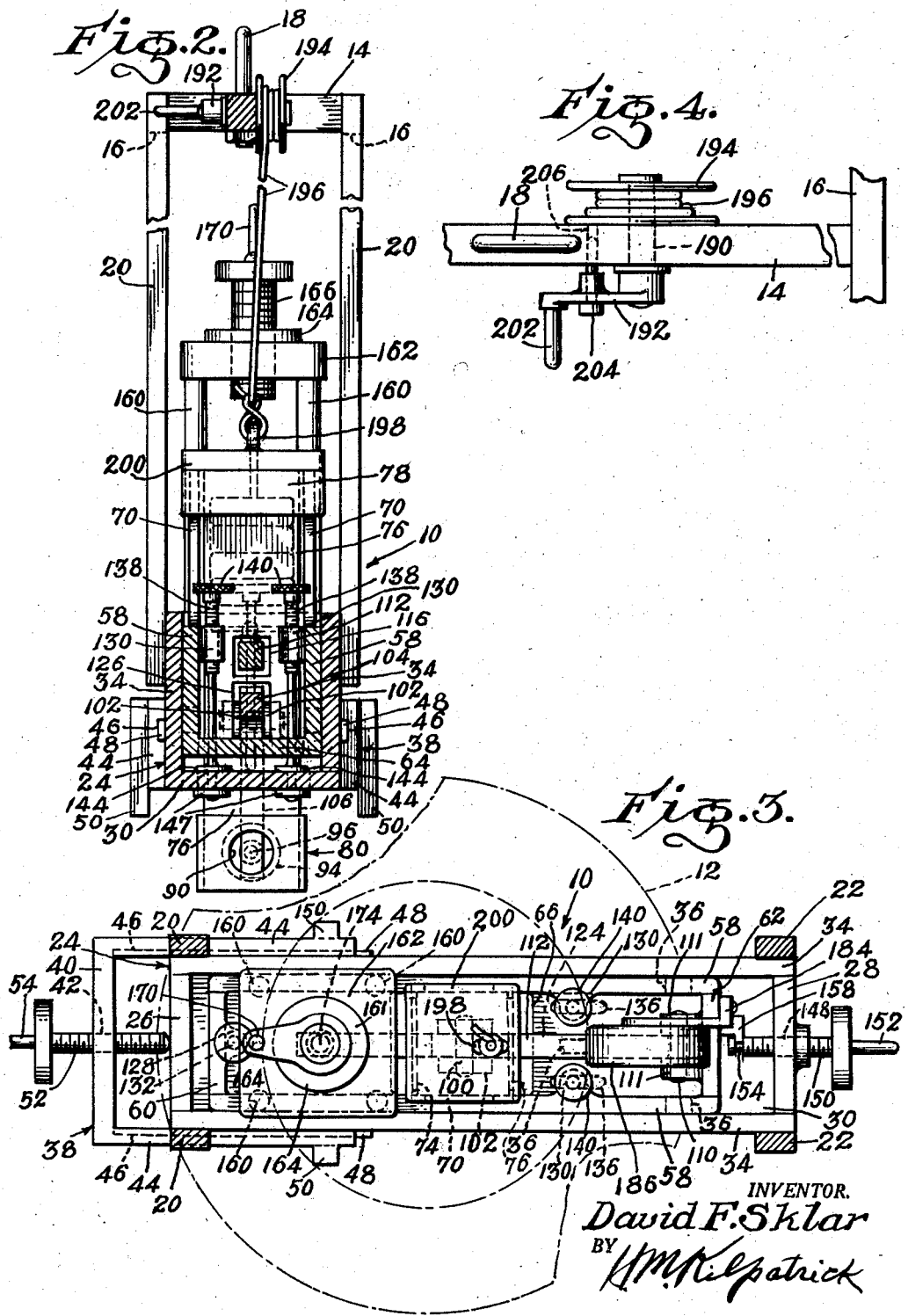

2,892,345

INNER FACE HARDNESS TESTER

David F. Sklar, Kent Cliffs, N.Y., assignor to The Torsion Balance Company, Clifton, N.J., a corporation of New York Application September 27, 1954, Serial No. 458,307

30 Claims. (Cl. 73—83)

This invention relates to machines or apparatus for testing hardness of articles, parts and the like of metal or other material wherein a load is applied to a penetrator or indentor which indents the test piece or structure, and relates more particularly to hardness testers of the type shown in United States Patents Nos. 1,516,207 and 1,516,208, issued to S. P. Rockwell having means for successively applying minor and major loads to the test piece, though it is noted that in many of the claims the invention is not limited to machines of this particular type.

One object of the invention is to provide an improved hardness tester which is easily moved to or transported to heavy or fixed or other structures to be tested.

Another object of the invention is to provide a hardness tester having a penetrator disposed for testing the inside face of a partly open heavy or fixed or other hollow structure.

Another object is to provide a hardness tester having means for clamping the tester on structures to be tested.

Another object of the invention is to provide means for adjustably mounting the tester on a structure to be tested to bring the penetrator in proper testing relation to the face to be tested.

Other objects are to provide a tester adjustably carried in a support adapted to be clamped on the test structure to be tested with the penetrator adjacent to the surface to be tested after which the tester may be moved to press the penetrator on the test structure so as to apply a minor load, and to provide means carried by the support for holding the tester from the support for inspection, replacement of parts or the like.

Another object of the invention is to provide means for gradually applying the major load without the use and expense of a dash pot.

Additional objects of the invention are to effect simplicity and efficiency in such testers and to provide an extremely simple tester of this kind which is convenient, economical, durable, accurate, and reliable in operation, and economical to manufacture.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a hardness tester for testing an inner test face of heavy or other hollow structure having an opening therein. A supporting structure adapted to be hoisted from place to place and clamped to said structure adjustably carries a tester having a plunger support projecting therefrom and carrying a plunger spaced from the tester support and supported and guided by the plunger support in a path transverse to the direction of projection of the plunger support and having a projecting indentor. A minor load and a hardness gauge carried by said tester support are operatively connected to the plunger; and means are provided for adjusting the tester support, to press the indentor to the test face, thereby to apply a minor load. Additional means are provided for applying a major load to the plunger.

In the accompanying drawing showing, by way of example, one of many possible embodiments of the invention, Fig. 1 is a central longitudinal vertical sectional view, partly in side elevation, showing the tester applied to a test structure;

Fig. 2 is a vertical sectional view taken on the line 2—2 of Fig. 1;

Fig. 3 is a horizontal sectional view taken on the line 3—3 of Fig. 1; and

Fig. 4 is a fragmental plan of a detail.

My improved hardness tester 10 for testing the inside surface of heavy upwardly open and other hollow test structures such as large journal bearings 12 is carried on an upright frame having a horizontal elongated upper member 14 carrying short end cross pieces 16 and a hoist-hook receiving eye 18 at its mid part by means of which the tester 10 is hoisted and moved to the structure 12 to be tested. Pairs of front and back upright side members 20, 22 secured to and pending from the ends of the cross pieces 16 have secured thereto an elongated lower horizontal outer housing 24 having front and rear end walls 26, 28, a floor 30 adapted to rest on said structure 12 and having a large intramarginal opening 32 at its mid-part, and side walls 34 secured at their ends to the lower ends of the side members 20, 22.

A downwardly projecting fixed stop 36 fast on the lower face of the floor near the rear end 28 of the housing is engageable with the inner face of said test structure 12. A U-shaped adjusting member 38 having a yoke part 40 having a central threaded opening 42 disposable near said end 26 has side arms 44 having inner guide grooves 46 slidably received on horizontal guide strips 48 secured fast on the lower part of the side walls extending from near the mid part of the side walls to the end 26 of the housing. Movable stops 50 fast on and projecting downwardly from the inner end parts of said side arms are engageable with the inner face of the test structure approximately opposite to said fixed stop 36; and an adjusting screw 52 received in said threaded opening 42 and engaging the adjacent end wall 26 is provided with a crank handle 54 whereby said screw may be rotated and the U-shaped member 38 adjusted to press all of said stops 36, 50 into rigid holding engagement with said test structure 12 to make the housing 24 rigid with the test structure.

An elongated inner tester housing 56 vertically adjustably and longitudinally slidably fitting in the outer housing 24 has side walls 58, front and rear end walls 60, 62 and a floor 64 having a large opening 66 over the large opening 32 of the outer housing floor.

Upwardly projecting side panels 70 integral with the mid-part of the side walls 58 of the tester housing support cross panels 72 secured to the upper part of the edge faces of the side panels and form with the panels an upper fixed box supporting parallel vertical flexible spring metal strips or plates 74, 76 having their upper ends mounted on the outer faces of the cross panels 72 between the cross panels and strengthening plates 78, the strips extending down through said large openings 32, 66 to a level below said stops 36, 50 and carrying a movable lower box 80 at said level having side panels 82 and front and rear cross panels 84, 86 secured at their inner faces to and against the spring strips 74, 76, said cross panels being provided with large axially alined front and rear openings or bores 88, 90 registering with similar openings in the spring strips, the front bore being threaded and receiving an axially horizontal plunger or holder 92 threadedly secured fast therein.

The plunger or holder 92 has a short front end bore receiving a chuck 94 having a projecting front end diamond point or penetrator 96 engageable with the inner face of said test structure 12. The plunger has a rear end center recess 96' receiving a ball or rounded end of a horizontal strut link 98. The strips 74, 76 and the lower box 80 constitute a plunger support for the plunger or holder 92.

A fulcrum pin 100 secured across the tester housing in lugs 102 on the floor of the tester housing pivotally supports an elbow lever 104 fulcrumed on said pin and having a short downturned arm 106 pivotally receiving the rear ball end of said strut link 98. A fulcrum pin 110 mounted in lugs 111 on the end wall 62 of the tester housing across the upper rear part of said housing fulcrums a power lever 112 longitudinally disposed in the tester housing and passing through openings 114, 116 in the spring plates 74, 76 and having its rear end fulcrumed on said pin and provided near the rear end of its lower face with a rounded recess 118. An upright strut link 120 has ball ends in the recess 118 of the power lever and an adjacent recess 122 in the free end of a horizontal arm 124 of the elbow lever passing through an opening 126 in the spring plate 76.

Lugs 128, 130 are mounted fast on the inner face of the front end wall 60 and the inner faces of the side walls 58 near their rear ends, said lugs respectively and the tester housing floor having alined vertical bores 132, 134, the bores 132 in the lugs being threaded.

Threaded adjusting screws 136, 138 having knurled heads 140 have their threads engaged in said bores 132, 134, the lower end of the front screw 136 engaging the floor of the outer housing. The side screws 138 extend through slots 146 in the outer housing floor and have collars 142, 144 detachably secured fast on the side screws engaging above and below the floor. The screws have knurled heads 140 on the upper ends whereby the height of the tester housing may be adjusted and consequently the height of the penetrator 96 relative to the part of the inner face of the structure 12 to be tested.

One end wall 28 of the outer housing has a threaded bore 148 therethrough receiving an adjusting screw 150 having a crank handle 152 on the outer end and an annular groove 154 around the inner end part receiving a vertical laterally projecting lip 156 on a block 158 fast on the adjacent end of the tester housing, whereby rotation of the adjusting screw may withdraw the tester housing 56 or move the tester housing to bring the penetrator 96 into engagement with the test surface with sufficient force to raise slightly the power lever 112, and thus apply a minor load, the weight of said power lever 112 and rear arm 124 serving as a minor load when the penetrator is initially sufficiently pressed on said face of said structure 112.

Four posts 160 on the side walls of the tester housing on respectively opposite sides of the verticial plane of the power lever 112 respectively near and beyond the forward free end of the power lever carry thereon a platform 162 having a large central opening having fast therein a nut 164 receiving a vertically elongated externally threaded bushing 166 having an inner beveled seat 168 at the upper end. A crank handle 170 secured fast by a set screw 171 to the upper end of the bushing serves for rotating the bushing. A loading rod 172 loosely disposed in said bushing and formed at the upper end with a ball 174 engageable in said seat carries a pan 176 fast on the lower end of the rod and having in its lower face a central recess 178 adapted to rest on a ball 180, in a free end recess of the power lever 112. Major-load weights 182 on said pan, forming with the rod and pan the major load are adapted by rotation of the bushing 166 to be raised from or lowered at medium slow speed to the free end ball of the power lever, thereby to remove or apply the major load at proper speed without the use of the expensive dash-pot as heretofore.

An upstanding bracket 184 on the end wall of the tester housing carries a hardness indicating dial 186 having a downwardly projecting operating spindle 188 attached to the power lever near the fulcrum end.

A horizontal shaft 190 rotatably mounted transversely through the upper frame member 14 near the mid part thereof has a crank arm 192 on one end and a winding drum 194 on the other end around which is secured one end of a flexible member or cord 196 secured at the other end to an eye 198 on a top plate 200 fast on the upper box. The crank arm 192 has at its free end a crank handle 202, whereby rotation of the shaft by the handle may, after the collars 144, sleeve 92 and plunger 94, are removed, draw the tester housing and parts carried thereby from the outer housing for change of parts or other purposes.

The crank arm 192 has a bore adjacent the handle slidably removably receiving a headed pin 204 adapted to be inserted and engaged in a bore 206 of the frame member 14, after the tester housing has been raised, to hold the shaft against retrograde movement and hold the housing raised.

The operation of the hardness tester will be readily understood from the foregoing and need now be only summarized as follows:

The movable stops 50 having been moved toward the fixed stop 36, and the major load weights having been raised after the last operation, the tester is moved by means of a suitable crane or other hoisting and transporting apparatus having a hook engaged in the eye 18 and the tester and lowered onto the test piece which may be a heavy structure such as the test structure 12 which may be lying on a floor, bench or the like.

The movable stops having been moved toward the fixed stop, all stops are inserted in the opening of the structure and the outer housing 24 is rested on the test structure.

Then the crank 54 is rotated to draw the movable stops away from the fixed stop until all stops 36, 50 are firmly engaged with the structure, to fix the outer housing on the structure.

Then by means of the knurled heads 140 and the crank 152 the inner housing is adjusted to bring the indentor or penetrator substantially into contact with the part of the inner face of the structure 12 to be tested. Then by means of the crank 152 the inner housing is moved to bring the penetrator into engagement with the test face firmly enough to raise the power lever 112, and thus apply the minor load and move the needle of the dial to its minor load position, which may be noted, or to which the dial may be zeroized.

Then by operating the handle 170, the major load is gradually lowered until the seat 168 clears the ball 174 and the pan 176 with the weights thereon rests firmly on the ball 180 of the power lever.

Then after the major load reading is taken, the major load is raised, the tester housing 56, the penetrator and the movable stops 50 are retracted, and the tester is hoisted from the test piece and is ready for another operation.

I claim as my invention:

1. A hardness tester for testing an inner test face of a hollow structure having an opening therein; said tester comprising a supporting structure; means for clamping the supporting structure on said hollow structure; a movable tester support movable on the supporting structure and having a plunger support projecting therefrom; a plunger spaced from the tester support and supported and guided by the plunger support in a path transverse to the direction of projection of the plunger support and having an end indentor; the overall dimension along said path of the indentor, plunger and plunger support being substantially as small as the width of said opening to allow moving of the plunger into the hollow structure and to bring the indentor into approximate testing relation with said test face; hardness testing mechanism operatively connected to the plunger for applying a load to the plunger, and means for moving the tester support, to press the indentor to the test face.

2. A hardness tester for testing an inner test face of a hollow structure having an opening therein; said tester comprising a supporting structure; a tester support adjustably carried by said supporting structure and having a plunger support projecting therefrom; a plunger spaced from the tester support and supported and guided by the plunger support in a path transverse to the direction of projection of the plunger support and having a projecting indentor; the overall dimension, along said path of the indentor, plunger and plunger support being smaller than the width of said opening; transporting means for relatively moving said structures in a direction transverse to said path to move the plunger into the hollow structure and bring the indentor into approximate testing relation with said test face; means for rigidly maintaining the structures in said relation; a minor load and a hardness gauge carried by said tester support and operatively connected to the plunger; means for adjusting the tester support, to press the indentor to the test face, thereby to apply the minor load; and means for applying a major load to the plunger.

3. A hardness tester for testing a test face of a structure, said tester comprising a horizontally elongated outer housing; means for fixing the housing on said structure; a horizontally elongated tester support longitudinally adjustable in the outer housing; a plunger supported on the housing and extending therebelow and guided longitudinally of the plunger and support below the housing and having a front end penetrator engageable with said face; and hardness testing mechanism on the tester support and connected to said plunger for applying a predetermined definite load to the plunger for pressing the plunger toward the test piece to press the penetrator a distance into the test piece; and means for indicating said distance in terms of hardness.

4. A hardness tester for testing the inner test face of an upwardly open structure, said tester comprising an elongated outer housing having side and end walls and a floor adapted to rest on said structure and having a large opening therein; a downwardly projecting fixed stop fast on the lower face of the floor near one end of the housing and engageable with the inner face of said structure; horizontal guide strips secured fast on the lower part of the side walls extending from near the mid part of the side walls to the other end of the housing; a U-shaped adjusting member having a yoke part having a central threaded opening disposable near said other end and side arms having inner guide grooves slidably received on said strips; movable stops fast on and projecting downwardly from the inner end parts of said side arms and engageable with the inner face of the structure approximately opposite to said fixed stop; an adjusting screw received in said threaded opening and engaging the adjacent end wall and provided with a crank handle whereby said screw and U-shaped member may be adjusted to press all of said stops into holding engagement with said structure to make the housing rigid with the structure; hardness testing mechanism adjustably mounted in said housing and carrying a lever part projecting downwardly through said opening and a penetrator operatively connected to said part and engageable with said face.

5. A hardness tester for testing the inner test face of an upwardly open structure, said tester comprising an elongated outer housing having a large opening in its floor; means for fixing the housing on said structure; an elongated inner tester housing vertically adjustably and longitudinally slidably fitting in the outer housing and having side walls, end walls and a floor with a large opening over the large opening of the outer housing floor; upwardly projecting side panels integral with the side walls of the tester housing defining therebetween a space over said large openings; cross panels secured to the upper part of the edge faces of the side panel and forming with the panel an upper fixed box; parallel vertical flexible spring metal strips having their upper ends mounted on the inner faces of the cross panels, the strips extending down through said large openings to a level below said stops; a horizontal plunger carried by the lower ends of said strips and having a penetrator engageable with said face; a power lever fulcrumed in the tester housing and connected to said plunger; a load pan positioned over and adapted to rest on the free end of the lever; and means supported on the tester housing for slowly lowering the pan.

6. A hardness tester for testing the inner test face of an upwardly open structure, said tester comprising an outer housing; means for fixing the housing on said structure; an elongated tester housing vertically and longitudinally adjustable in the outer housing; cross panels secured to and above the mid part of the tester housing; downwardly projecting spring strips pending from said panels; a movable lower box at said level having side panels and having front and rear cross panels secured at their inner faces against the strips, and provided with large axially alined front and rear bores, the front bore being threaded; an axially horizontal plunger sleeve threadedly secured in said front bore; a plunger slidably fitting in said sleeve having a projecting front end penetrator engageable with the inner face of said structure, and a rear end center recess; a power lever fulcrumed in the tester housing and connected to said plunger; and a load pan positioned over and adapted to rest on the free end of the lever.

7. A hardness tester for testing the inner test face of an upwardly open structure, said tester comprising an elongated outer housing having side walls and a floor having longitudinal slots near the side walls; means for fixing the housing on said structure; an elongated tester housing vertically and longitudinally adjustably fitting in the outer housing and having side and end walls and a floor; an axially movable horizontal plunger having a front end penetrator; means for supporting and guiding the plunger below the housings, a power lever fulcrumed in the tester housing and connected to said plunger; a major load pan over and adapted to rest on the free end of the lever; lugs on the inner face on an end wall and the opposite ends of the side walls; said lugs respectively and the tester housing floor having alined vertical bores, the bores in the lugs being threaded; front and side threaded adjusting screws having their threads engaged in said bores, the lower end of the front screw engaging the floor of the outer housing; the side screws extending through said slots in the outer housing floor; collars removably secured fast on the side screws engaging above and below the floor; knurled heads on the upper ends of the adjusting screws whereby may be adjusted the height of the tester housing and consequently the height of the penetrator relative to said structure inner face to be tested.

8. A hardness tester for testing the inner test face of an upwardly open structure, said tester comprising an elongated outer housing; means for fixing the housing on said structure; an elongated tester housing longitudinally adjustable in the outer housing; an axially horizontal plunger supported longitudinally on and guided below the housings and having a front end penetrator; tester mechanism in the tester housing and connected to said plunger; and means carried by the outer housing and engaging the tester housing for moving the tester housing horizontally to bring the penetrator into engagement with said face.

9. A hardness tester for testing the inner test face of an upwardly open structure, said tester comprising an elongated outer housing having side and end walls; means for fixing the housing on said structure; an elongated tester housing vertically and longitudinally adjustably fitting in the outer housing and side and end walls; an axially movable horizontal plunger having a front end penetrator; means for supporting and guiding the plunger below the housing; a power lever fulcrumed in the tester housing; an elbow lever pivoted at its elbow part in the tester housing and having a downturned arm connected to the plunger and a rear arm connected to the power lever; a major load pan over and adapted to rest on the free end of the lever; one end wall of the outer housing having a threaded bore therethrough; an adjusting screw in said bore having a crank handle on the outer end and an annular groove around the inner end part; a block fast on the adjacent end of the tester housing and having a lip engaging in said groove; whereby rotation of the adjusting screw may withdraw the tester housing or move the tester housing to bring the penetrator into engagement with the test face with sufficient force to raise the power lever, and thus supply a minor load; the weight of said power lever and rear arm serving as a minor load when the penetrator is initially pressed on said face of said structure.

10. A hardness tester for testing the inner test face of an upwardly open structure, said tester comprising an elongated tester housing; means for fixing the housing on said structure; a longitudinally disposed power lever fulcrumed at one end in the tester housing; a major load adapted to be placed on the free end of the lever; an axially horizontal plunger longitudinally supported on, and guided below, the housing and having a front end penetrator directed to said face; and an elbow lever fulcrumed at its elbow part in said housing and having a downturned arm connected to said plunger and a rear arm directed away from said face and having its free end connected to the power lever.

11. A tester as in claim 10, having means for forcing said housing in the direction of the penetrator to press the penetrator against the test face thereby to raise the power lever and said rear arm and thereby apply a minor load.

12. A hardness tester for testing the inner test face of an upwardly open structure, said tester comprising an elongated outer housing; means for fixing the housing on said structure; an elongated tester housing vertically and longitudinally adjustable in the outer housing and having side walls; an axially horizontal plunger longitudinally supported on and guided below the housing and having a front end penetrator engaged with said test face; a longitudinally disposed power lever fulcrumed at one end in the tester housing; a major load pan over and adapted to rest on the free end of the lever; a fulcrum pin mounted across the mid part of the tester housing; an elbow lever fulcrumed at its elbow part on said pin and having a short downturned arm connected to said plunger and a horizontal rear arm directed away from the engaged part of said face and having its free end connected to the power lever, and means for forcing said housing in the direction of the penetrator to press the penetrator against the test face thereby to raise the power lever and said rear arm and thereby apply a minor load.

13. A hardness tester for testing the inner test face of an upwardly open structure, said tester comprising an elongated outer housing having a large bottom opening; means for fixing the housing on said structure; an elongated tester housing vertically and longitudinally adjustable in the outer housing and having side walls and a large bottom opening; an axially horizontal plunger axially movable below the housings and having a front end penetrator and a rear end recess; means carried by the tester housing for supporting and guiding the plunger; a horizontal strut link having a forward ball end in said recess; a fulcrum pin secured across the tester housing above said large openings; an elbow lever fulcrumed on said pin and having a short downturned arm having near its end a recess pivotally receiving the rear end of said strut link; said lever having a rear arm having a recess in its upper face; a fulcrum pin mounted in the side walls of the tester housing across the upper rear part of said housing; a power lever longitudinally disposed in the tester housing and having its rear end fulcrumed on said pin and provided near the rear end of its lower face with a ball receiving recess; an upright strut link having ball ends received in the adjacent recesses of the rear arm and power lever and a major load on the free end of the power lever.

14. In a hardness tester, the combination of a longitudinally disposed power lever; an axially vertical large nut mounted on the tester over the free end of the lever; a threaded bushing in the nut and having a crank, and an inner seat at its upper end; a loading rod in said bushing and having an upper end enlargement ball engageable in said seat; a weight pan on the lower end of the rod and adapted to rest on the free end of the power lever; a penetrator; and means operatively connecting the power lever and penetrator and operated by the power lever for applying a load to the penetrator.

15. In a hardness tester the combination of a support; an axially vertical nut mounted on the support; a threaded bushing in the nut; means for rotating the bushing; a loading rod in said bushing and having an upper ball engageable in said seat; a power lever; a pan on the lower end of the rod and adapted to rest on the free end of the power lever; a weight pan suspended by said rod; a penetrator; and means operatively connecting the power lever and penetrator and operated by the power lever for applying a load to the penetrator.

16. A hardness tester for testing the inner test face of an upwardly open structure, said tester comprising an elongated tester housing having side walls; means for supporting the housing on said structure; an axially movable horizontal plunger having a front end penetrator; means for supporting and guiding the plunger below the housing and in said open structure; a horizontal power lever fulcrumed in the tester housing; means operatively connecting the power lever to the plunger for applying a load to said plunger and having a ball on its free end; four posts on the floor of the tester on respectively opposite sides of the vertical plane of the power lever respectively near and beyond the forward end of the power lever; a platform on said posts; a nut fast in said opening; a vertically elongated externally threaded bushing in said opening having an inner beveled seat at the upper end; a crank handle secured to the upper end of the bushing; a loading rod loosely disposed in said bushing and formed at the upper end with a ball engageable in said seat; and a major load pan fast on the lower end of the rod and having at its lower face a central recess adapted to rest on said ball.

17. A hardness tester for testing the inside surface of heavy upwardly open hollow structures such as large journal bearings, said tester comprising an upright frame having a horizontal elongated upper member having short cross pieces and a hoist hook receiving eye at its mid part, pairs of front and back upright side members secured to and pending from the ends of the cross pieces; an elongated lower horizontal outer housing having end walls, a floor adapted to rest on said structure and having a large intramarginal opening, and side walls secured at their ends to the lower ends of the side members; means for fixing the housing on said structure; an elongated tester housing vertically and longitudinally adjustable in the outer housing and having a large opening in its floor; suspending means secured to the upper part of the tester housing and passing through said openings; an axially horizontal plunger supported by the suspending means below the housings and having a front end penetrator; a power lever fulcrumed in the tester housing; means operatively connecting the power lever to the plunger for applying a load to said plunger; a major-load pan over and adapted to rest on the free end of the lever; and means supported on the tester housing for slowly lowering the pan.

18. In a hardness tester for testing a test face of a structure, said tester comprising an elongated outer housing; means for fixing the housing on said structure; an elongated tester housing vertically movable and adjustable in the outer housing; a plunger supported on and guided below the housings and having a front end penetrator engageable with said face below the bottom of the outer housing; a testing mechanism in the tester housing and operatively connected to said plunger for applying a load to said plunger; a hoisting frame secured to and upwardly extending from the outer housing and having an upper member; and hoisting means secured on the upper member and connected to the tester housing for lifting the tester housing relative to the outer housing.

19. A hardness tester for the inner test face of an upwardly open structure, said tester comprising a hoisting frame having a horizontal upper member having a hoisting eye; an outer housing carried on the frame; means for fixing the housing on said structure; an elongated tester housing vertically and longitudinally adjustable in the outer housing and having side walls having upwardly extended side panels at the mid part; cross panels secured to the front and rear edges of the upper part of the side panels and forming an upper box; downwardly projecting spring strips pending from said panels; a horizontal plunger below the housings secured to the lower part of the strips and having a penetrator engageable with said test face; a power lever fulcrumed in the tester housing and operatively connected to said plunger; a major load pan disposable on the free end of the power lever; a top plate secured on the top of the upper box and having an eye on top; a horizontal shaft rotatably mounted transversely through the upper frame member near the mid part thereof and having a winding drum on one end and a crank on the other; a flexible member or cord secured to said eye on said top plate and said drum, whereby rotation of the shaft by the handle may draw the tester housing and parts carried thereby from the outer housing for change of parts or other purposes.

20. A hardness tester comprising an elongated support; means for fixing the end portions of the support on a structure having a test face; an elongated plunger longitudinal to the support and offset therefrom and having a front end penetrator engageable with the test face; means supported by the support for longitudinally guiding the plunger below the support intermediately between the ends of the support; and a load adapted to press the plunger forwardly.

21. A hardness tester comprising a support; a power lever fulcrumed on the support; a plunger substantially parallel to the lever and having a front end penetrator operable by motion in a given direction parallel to the lever; means supported by the support for supporting and guiding the plunger longitudinally; a load adapted to press on the free end of the lever; and means operatively connecting the plunger and lever for pressing the plunger in said given direction when the lever is pressed upon by the load.

22. A hardness tester comprising an elongated main support; said support having end portions; means for securing said portions substantially fixed on a structure; an elongated tester support longitudinal to, and longitudinally movable on the main support; a power lever fulcrumed on the tester support longitudinally thereof; an axially horizontal plunger having a front end penetrator; means supported by the tester support for guiding the plunger below the supports substantially parallel to the main support intermediately between the ends of the main support; a load adapted to press on the free end of the lever; and means operatively connected to the plunger and lever to press the plunger in line substantially with the axis thereof and in the sense from plunger to penetrator when the lever is pressed on by the load.

23. A hardness tester comprising an elongated main support; said support having end portions; means for securing said portions substantially fixed on a structure having a test face; an elongated tester support longitudinal to, and longitudinally adjustable and supported at both ends on the main support; a power lever fulcrumed on the tester support longitudinally thereof; an elongated plunger having a penetrator engageable with said face; means supported by the tester support for guiding the plunger spaced from the supports intermediately between the ends of the supports; a major load adapted to press on the free end of the lever, and means operatively connecting the plunger and lever for pressing the penetrator against said face.

24. A hardness tester for testing an inner test face of a hollow structure having an opening therein; said tester comprising a supporting structure; a tester support adjustably carried by said supporting structure and having a plunger support projecting therefrom transverse to the path of adjustment of the tester support, a plunger spaced from the tester support and supported and guided by the plunger support in a path parallel to said first named path and transverse to the direction of projection of the plunger support and having a projecting indentor; the indentor, plunger and plunger support being small enough for insertion into said opening with the indentor in approximate testing relation with said test face; means for rigidly securing and maintaining the structure against relative movement in any direction, in said relation; a hardness gauge carried by said tester support and operatively connected to the plunger; means for adjusting the tester support, to press the indentor to the test face; and means carried by the tester support for applying a load to the plunger for pressing the indentor into the test face.

25. A hardness tester for testing an inner test face of a tester structure having an opening therein; said tester comprising a supporting structure; a tester support adjustably carried by said supporting structure and having a plunger support projecting therefrom; a plunger spaced from the tester support and supported and guided by the plunger support in a path transverse to the direction of projection of the plunger support and having a projecting end indentor disposed in approximate testing relation with said test face; means for rigidly securing and maintaining the structures, against relative movement; a hardness gauge carried by said tester support and operatively connected to the plunger; means for adjusting the tester support, to press the indentor to the test face; and means carried by the tester support for applying a load to the plunger for pressing the indentor into the test face.

26. A hardness tester for testing a test face of a structure, said tester comprising a tester housing having side walls carrying upwardly extended side panels at the mid part; means for fixing the housing on said structure; cross panels secured to the edges of the side panels; downwardly projecting spaced spring strips pending in substantially parallel planes from said cross panels; a horizontally elongated plunger below the housing secured to the lower part of the strips substantially perpendicular to said planes and having a front end penetrator engageable with said test face; hardness testing mechanism connected to the plunger for applying a predetermined definite load to the plunger for pressing the plunger toward the test face to press the penetrator a distance into the test face; and means for indicating said distance in terms of hardness.

27. A hardness tester for testing the inner test face of an upwardly open structure, said tester comprising an elongated outer housing having a floor having an opening therein; means for fixing the housing on said structure; an elongated tester housing vertically adjustably fitting in the outer housing; vertical adjusting screws having threaded connection with the tester housing and engaging said floor for adjusting the height of the tester housing; an axially horizontal plunger having a front end penetrator; means secured to said housing and passing through said opening for supporting and guiding the plunger below the housing in position for the penetrator to engage said test face; and hardness testing mechanism connected to the plunger for applying a predetermined definite load to the plunger for pressing the plunger toward the test face to press the penetrator a distance into the test face; and means for indicating said distance in terms of hardness.

28. A hardness tester for testing a test face of a heavy structure, said tester comprising a horizontally extended support having flat bottom portions adapted to rest on said structure, the structure having a face to be tested below said bottom portions when the latter rest on the structure; attaching means on the tester for cooperation with a carrier to transport the tester and lay said bottom on the structure; means for fixing said bottom portions on said structure; a plunger carrying a penetrator; means movably supporting and guiding the plunger with the penetrator beneath the bottom of said support; a plurality of definite load weights; a pan above said penetrator and bottom and on which said weights may rest; and hardness testing mechanism connecting said plunger and pan for applying the definite forces of said weights to the plunger for pressing the plunger toward the test piece to press the penetrator a distance into the test piece; and means for indicating said distance in terms of hardness.

29. A hardness tester for testing a test face of a heavy structure, said tester comprising a support having a bottom adapted to rest on said structure; a tall hoisting frame having an upper attaching means for attaching a hoisting means, and downwardly extending members secured to said support, whereby the hoisting means may transport the structure laterally and downwardly to said structure; means for fixing the support on said structure; a plunger having an end penetrator; means movably supporting and guiding the plunger on the support with the penetrator beneath the bottom of said support in position to engage said face; a substantially horizontal power lever disposed near and above said bottom and fulcrumed at one end on said support and operatively connected to the plunger; a hardness indicator operatively connected to the power lever; a pan resting on the free end of the power lever; and means entirely above said bottom for gradually lowering the pan and holding the pan and weights from swinging when tester is laterally transported; the lever, pan, weights and the means for lowering being disposed entirely above said bottom to avoid interference by said structure.

30. A hardness tester for testing an inner face of an upwardly open heavy journal bearing; said tester comprising a horizontally elongated support having a flat bottom adapted to rest on said bearing; a tall hoisting frame having an upper eye and downwardly extending members secured to the ends of said support, whereby hoisting means engaging said eye may transport the structure and lay said bottom on the bearing; means for fixing the support on said bearing; a horizontally elongated plunger having an end penetrator; means longitudinally movably supporting and guiding the plunger beneath the bottom of said support in position for the penetrator to engage with said inner face; a horizontal power lever disposed near and above said bottom and fulcrumed at one end on said support and operatively connected to the plunger; a hardness indicator operatively connected to the power lever; a ball on the free end of the power lever; a pan above the lever and having a bottom recess receiving the ball for supporting the pan; load weights on said pan; a loading rod secured to and upwardly extending from said pan and having an upper end ball; an axially vertical nut mounted on said support over the free end of the lever; and a threaded bushing rotatable in the nut and having a seat in its upper end receiving said ball, the bushing cooperating with the rod and balls for holding the pan and weights from swinging when the tester is laterally transported.

References Cited in the file of this patent

UNITED STATES PATENTS

| | | |
|---|---|---|
| 1,634,444 | Benton | July 5, 1927 |
| 1,785,542 | Dockl | Dec. 16, 1930 |
| 2,233,403 | Dickinson et al. | Mar. 4, 1941 |
| 2,241,347 | Hem | May 6, 1941 |
| 2,258,424 | Smith | Oct. 7, 1941 |
| 2,389,030 | Dana | Nov. 13, 1945 |
| 2,473,179 | Sklar | June 14, 1949 |
| 2,544,205 | Williams | Mar. 6, 1951 |

FOREIGN PATENTS

| | | |
|---|---|---|
| 384,885 | Great Britain | Dec. 15, 1932 |
| 603,531 | Germany | Oct. 3, 1934 |
| 618,470 | Germany | Sept. 9, 1935 |
| 431,855 | Italy | Mar. 8, 1948 |
| 704,290 | Great Britain | Feb. 17, 1954 |